M. C. SCHWEINERT.
PUMP COUPLING.
APPLICATION FILED OCT. 26, 1915.
1,297,741.
Patented Mar. 18, 1919.
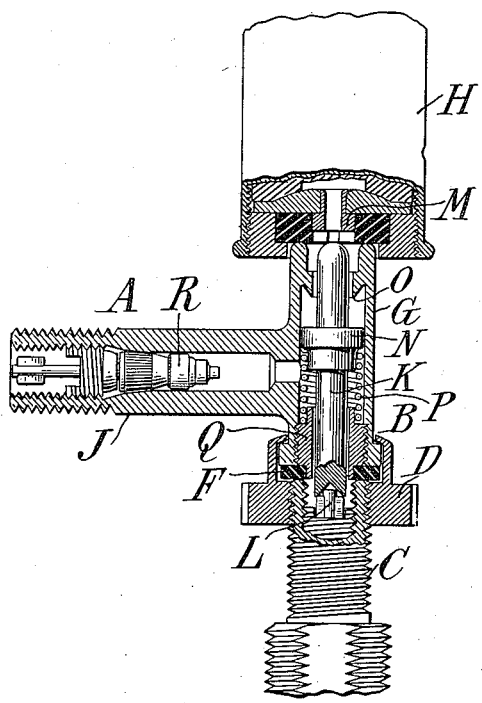
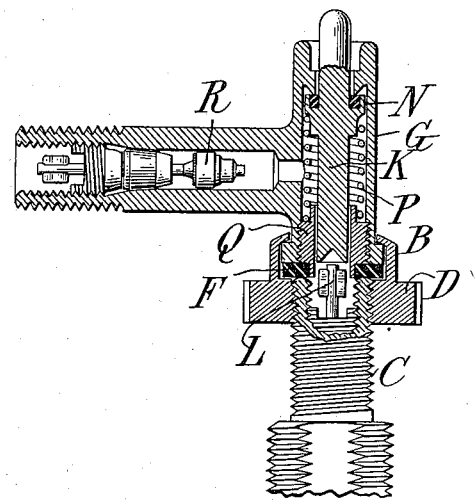
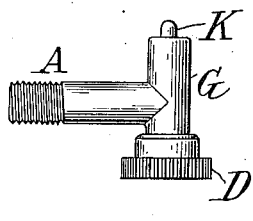
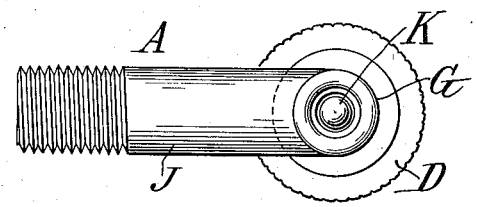
WITNESSES:
René Muine
Fred White
INVENTOR:
Maximilian Charles Schweinert,
By Attorneys,
Fraser, Tink & Myers

UNITED STATES PATENT OFFICE.

MAXIMILIAN CHARLES SCHWEINERT, OF WEST HOBOKEN, NEW JERSEY.

PUMP-COUPLING.

1,297,741.  Specification of Letters Patent.  Patented Mar. 18, 1919.

Application filed October 26, 1915. Serial No. 57,943.

*To all whom it may concern:*

Be it known that I, MAXIMILIAN CHARLES SCHWEINERT, a citizen of the United States of America, residing in West Hoboken, in the county of Hudson and State of New Jersey, have invented certain new and useful Improvements in Pump-Couplings, of which the following is a specification.

This invention relates to pump couplings for pneumatic tires or similar devices, and aims to provide certain improvements therein.

According to the preferred form of the invention the coupling is constructed with three branches, the first of which is adapted for connection to the tire valve, and the second of which is formed in alinement with the first and is adapted for the application of a pressure gage. The third branch is conveniently formed at right angles to the first two, and is adapted for connection with the inflating tube of the pump or other source of air. The construction involves a plunger which is adapted to be depressed by the tire gage to force down the tire valve. Such plunger is normally held in its upward or retracted position by a spring, and is provided with or actuates a valve which in its retracted position forms a closure for the device so as to prevent leakage of air when the pressure gage is not in use. The invention also includes certain other features of construction which will be hereinafter more fully described.

Referring to the drawings which illustrate the preferred form of the invention:—

Figure 1 is a diametrical section of the pump coupling, showing a gage and tire valve partly in section.

Fig. 2 is a similar section with the gage removed.

Fig. 3 is a side elevation of the pump coupling detached, on a scale which is substantially that employed in practice.

Fig. 4 is a plan of Fig. 3 on an enlarged scale.

Referring to the drawings, let A indicate the pump coupling as a whole which is provided with a branch B adapted to fit the nipple of a tire valve C. Any suitable form of connecting means may be employed, such for instance as screw-threading the branch B, or preferably by the use of a swiveled nut or union D. The branch B carries a packing F which makes a tight joint with the top of the nipple C. In axial alinement with the branch B is the branch G which is designed to receive a pressure gage such as that shown at H. Connected with the branches B and G, and preferably at right angles thereto, is the branch J which is designed to be connected with the pump tube or tube from the air tank, or other source of air.

Moving in the branches B and G is a plunger K, the lower end of which is adapted to engage the valve pin L of the tire valve when the plunger is pressed downwardly. Normally when the parts are in the position of Fig. 2 the plunger is retracted from the pin and the entering air forces down the tire valve, and thus enters the tire. When a gage, such as H, is applied to the device, however, the top of the plunger is engaged by an abutment M on the gage, and this forces down the pin, permitting air to flow upwardly around the plunger into the gage.

The plunger is provided with a valve, such as N, which normally engages a seat O formed preferably in the branch G, so that when the gage is not in place outlet of air through the branch G is prevented. Upon application of the gage the valve is unseated and a passage established through the branch and into the gage, as before described.

Preferably the plunger K is provided with a spring P which normally presses it against its seat. The upper end of the spring is shown as engaging the valve while its lower end bears against a hollow plug Q screwed in the branch B. There is sufficient space between the lower end of the plunger K and the threaded plug Q to provide an ample passage for the entering air.

It is preferable to provide in the branch J a check valve R which may be of well-known type, and which prevents any back flow of air from the pump coupling into the pump or air line. The valve R is shown open in Fig. 2.

It will be observed that the plunger K is also useful in releasing air from the tire should it be over-inflated, the construction of the top of the plunger being such as to make it easily engaged and operated by the finger.

While I have described the construction as formed with branches, it will be understood that these refer more especially to the arrangement of passages than to the exterior shape of the device. It will also be understood that various changes may be made in the construction herein set forth without departing from the invention.

What I claim is:—

1. A pump coupling having means for connection with a tire valve, means for connection with a pressure gage, and means independent of the pressure gage and adapted to be operated by it for depressing the deflating pin of the tire valve.

2. A pump coupling having a part adapted to be connected with a tire valve, a part adapted to be connected with a pressure gage, and a plunger independent of the pressure gage and adapted to be operated by it to force down the deflating pin of the tire valve.

3. A pump coupling having a part adapted to be connected with a tire valve, a part adapted to be connected with a pressure gage, and a plunger independent of the pressure gage and adapted to be operated by it to force down the deflating pin of the tire valve, said plunger having a valve which is normally closed and adapted to be opened by the descent of the plunger.

4. A pump coupling having a part adapted to be connected with a tire valve, a part adapted to be connected with a pressure gage, a plunger independent of the pressure gage and adapted to be operated by it to force down the deflating pin of the tire valve, said plunger having a valve which is normally closed and adapted to be opened by the descent of the plunger, and a spring for normally pressing said valve against its seat.

5. A pump coupling having three branches, the first being adapted for connection with a tire valve, the second being in axial alinement therewith and being adapted for connection with a pressure gage, and the third being adapted for connection with a source of air supply, and a plunger passing through the first two branches adapted to be operated by the pressure gage to press down the deflating pin of the tire valve.

6. A pump coupling having three branches, the first being adapted for connection with a tire valve, the second being in axial alinement therewith and being adapted for connection with a pressure gage, and the third being adapted for connection with a source of air supply, and a plunger passing through the first two branches adapted to be operated by the pressure gage to press down the deflating pin of the tire valve, and a valve carried by said plunger adapted to close the passage through said second branch when the gage is not in use.

7. A pump coupling having three branches, the first being adapted for connection with a tire valve, the second being in axial alinement therewith and being adapted for connection with a pressure gage, and the third being adapted for connection with a source of air supply, a plunger passing through the first two branches adapted to be operated by the pressure gage to press down the deflating pin of the tire valve, a valve carried by said plunger adapted to close the passage through said second branch when the gage is not in use, and a spring for normally pressing said valve against its seat.

8. A pump coupling comprising a three-branched structure, the first two branches being in axial alinement, and one being adapted for connection with a tire valve and the other being adapted for connection with a pressure gage, and the third branch being connected with the other two at an angle thereto, a plunger extending through the first two branches and having its lower end adapted to contact with the deflating pin of the tire valve, and its upper end being adapted to contact with the abutment of a pressure gage.

9. A pump coupling comprising a three-branched structure, the first two branches being in axial alinement, and one being adapted for connection with a tire valve and the other being adapted for connection with a pressure gage, and the third branch being connected with the other two at an angle thereto, a plunger extending through the first two branches and having its lower end adapted to contact with the deflating pin of the tire valve, and its upper end being adapted to contact with the abutment of a pressure gage, a valve carried by said plunger, and a seat for said valve in said second branch, whereby the valve is closed when the gage is removed.

10. A pump coupling comprising a branch B having a connecting member D, a packing carried at the end of said branch, a branch G in axial alinement with the branch B, said branch G having an internal valve seat, a plunger in said two branches, the lower end of which is adapted to engage the deflating pin of the tire valve, and the upper end of which is adapted to be engaged by a pressure gage, a valve carried by the plunger and coacting with said seat, and a spring surrounding said plunger and pressing said valve toward its seat.

11. A pump coupling comprising a branch B having a connecting member D, a packing carried at the end of said branch, a branch G in axial alinement with the branch B, said branch G having an internal valve seat, a plunger in said two branches, the lower end of which is adapted to engage the deflating pin of the tire valve, and the upper end of which is adapted to be engaged by a pressure gage, a valve carried by the plunger and coacting with said seat, a spring surrounding said plunger and pressing said valve toward its seat, and a hollow plug in said first-named branch against which said spring reacts.

12. As a new article of manufacture, a pump coupling having means for connection with the tire valve and means for depressing the deflating pin of the tire valve, together with means for temporary connection with a separate pressure gage, the means for depressing the deflating pin being adapted to coöperate with the pressure gage when the latter is applied, whereby the act of applying the gage also opens the tire valve.

13. As a new article of manufacture, a pump coupling having means for connection with the tire valve and means for depressing the deflating pin of the tire valve, together with means for temporary connection with a separate pressure gage, the means for depressing the deflating pin being adapted to coöperate with the pressure gage when the latter is applied, whereby the act of applying the gage also opens the tire valve, and a valve operated by the movement of said depressing means adapted to open communication between the tire valve and the pressure gage when the latter is applied.

In witness whereof, I have hereunto signed my name in the presence of two subscribing witnesses.

MAXIMILIAN CHARLES SCHWEINERT.

Witnesses:
    T. F. WALLACE,
    FRED WHITE.